United States Patent
Tetteh et al.

(10) Patent No.: US 9,049,136 B2
(45) Date of Patent: Jun. 2, 2015

(54) SYSTEM AND METHOD FOR PACKET TRANSMISSION ALONG SHORTEST-PATH TO MULTIPLE DESTINATIONS

(71) Applicant: Raytheon BBN Technologies Corp., Cambridge, MA (US)

(72) Inventors: William Nii Tetteh, Cambridge, MA (US); Christophe Jean-Claude Merlin, Malden, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 152 days.

(21) Appl. No.: 13/788,092

(22) Filed: Mar. 7, 2013

(65) Prior Publication Data
US 2014/0254387 A1    Sep. 11, 2014

(51) Int. Cl.
*H04L 12/801* (2013.01)

(52) U.S. Cl.
CPC ..................... *H04L 47/15* (2013.01)

(58) Field of Classification Search
CPC ........................................ H04L 47/15
See application file for complete search history.

(56) References Cited

U.S. PATENT DOCUMENTS

| | | | |
|---|---|---|---|
| 2009/0161578 A1* | 6/2009 | Yeung et al. | 370/254 |
| 2009/0245159 A1* | 10/2009 | Oyman et al. | 370/315 |
| 2010/0189044 A1* | 7/2010 | Roy et al. | 370/328 |
| 2010/0303005 A1* | 12/2010 | Gossain et al. | 370/328 |

OTHER PUBLICATIONS

Roy, S., et al., "Using Minimal Source Trees for On-Demand Routing in Ad Hoc Networks", *In: Proceedings of the 20th Annual Joint Conference of the IEEE Computer and Communications Societies (INFOCOM 2001)*, vol. 2, (Apr. 2001), 1172-1181.

* cited by examiner

*Primary Examiner* — Clemence Han
(74) *Attorney, Agent, or Firm* — Schwegman Lundberg & Woessner, P.A.

(57) ABSTRACT

A system, method and apparatus arranged for efficient usage of network resources. Embodiments include nodes linked together, and the links having differing costs, e.g., bandwidth, frequency, and/or monetary cost, or any combination of these. Embodiments may identify neighboring nodes as either next-hop-neighbors or non-next-hop-neighbors. Next-hop-neighbors lie on the shortest path to any node, while non-next-hop-neighbors are nodes linked directly to a node, but the link is more costly than an alternative multi-hop path to the same node. Accordingly, embodiments may suppress packets to the non-next-hop-neighbors.

21 Claims, 5 Drawing Sheets

SYSTEM AND METHOD FOR PACKET TRANSMISSION ALONG SHORTEST-PATH TO MULTIPLE DESTINATIONS

This invention was made with Government support under Contract Number FA8750-11-C-0201. The Government has certain rights in this invention.

TECHNICAL FIELD

Embodiments pertain to wireless or wired communications. Some embodiments relate to efficient network communication.

BACKGROUND

Programmers frequently use the Dijkstra and Floyd-Warshall algorithms for finding a shortest path (paths couple nodes together via one or more links, path and route are interchangeable; links directly couple two nodes). Dijkstra's algorithm makes it possible to find a shortest travel time value from a starting node to all other nodes in a network; the paths having non-negative costs. Cost can be, for example, monetary, hop-count, or latency. Dijkstra's algorithm finds the path with lowest cost (i.e., the shortest path) between a node and every other node. It can also find the shortest paths from a first node to a second node by stopping the algorithm once the shortest path to the second node has been determined. For example, if the nodes of the graph represent cities and edge-path costs represent driving distances between pairs of cities connected by a direct road, Dijkstra's algorithm can be used to find the shortest route between one city and all other cities. As a result, these algorithms are widely used in network routing protocols, most notably intermediate system to intermediate system (IS-IS) and Open Shortest Path First (OSPF).

If the cost of a link changes, OSPF, for example, implements Link State Update (LSU) packets to notify all other nodes of the update and to recompute routing tables. OSPF floods or broadcasts LSUs to all routers such that each router can maintain a table of the shortest path.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Shortest Path Routing (SPR) protocols indiscriminately forward packets to all neighbors of trees specifically built by routing. This may cause more packet transmissions than needed, and it is particularly damaging in networks where sending over high-cost links is particularly taxing, as in multi-rate networks or on third-party links that charge money. Some embodiments described below can shift the burden of transmitting from high-cost (e.g., low data-rate (LDR)) links to the minimum set of low-cost (e.g., high data-rate (HDR)) links whenever possible.

Additional embodiments can ensure that link state remains scalable while the network maintains LDR links between nodes. In addition to general broadcast packets, embodiments can send control packets, multicast packets, or unicast packets only on shortest paths in the network, thereby further reducing network traffic on LDR links.

Link state routing periodically floods LSUs to build a view of the entire network. With this information, each node can run a shortest-path algorithm and construct a tree to reach every destination at the lowest cost. Nodes can also send an LSU when they receive an indication that a cost of a path to a neighbor has changed. However, the scalability of LSU floods can be problematic in multi-rate systems or systems with different link costs in general. For example, a node may have a combination of nearby neighbors (on HDR and LDR links) and others that are on LDR-only links. Sending packets on each link, including LDR links, can be slow, costly, and unnecessary.

In some embodiments, broadcast packets, multicast packets, or LSUs can be broken into unicast packets—one for each destination. These unicast packets can be called broadcast-related packets because each is a packet that is one of a group of two or more packets intended for two or more nodes. Broadcast-related packets need not be limited to unicast versions of broadcast packets, but can also be unicast versions of any other packet intended for multiple destinations, e.g., multicast packets or LSUs.

Figure 1:
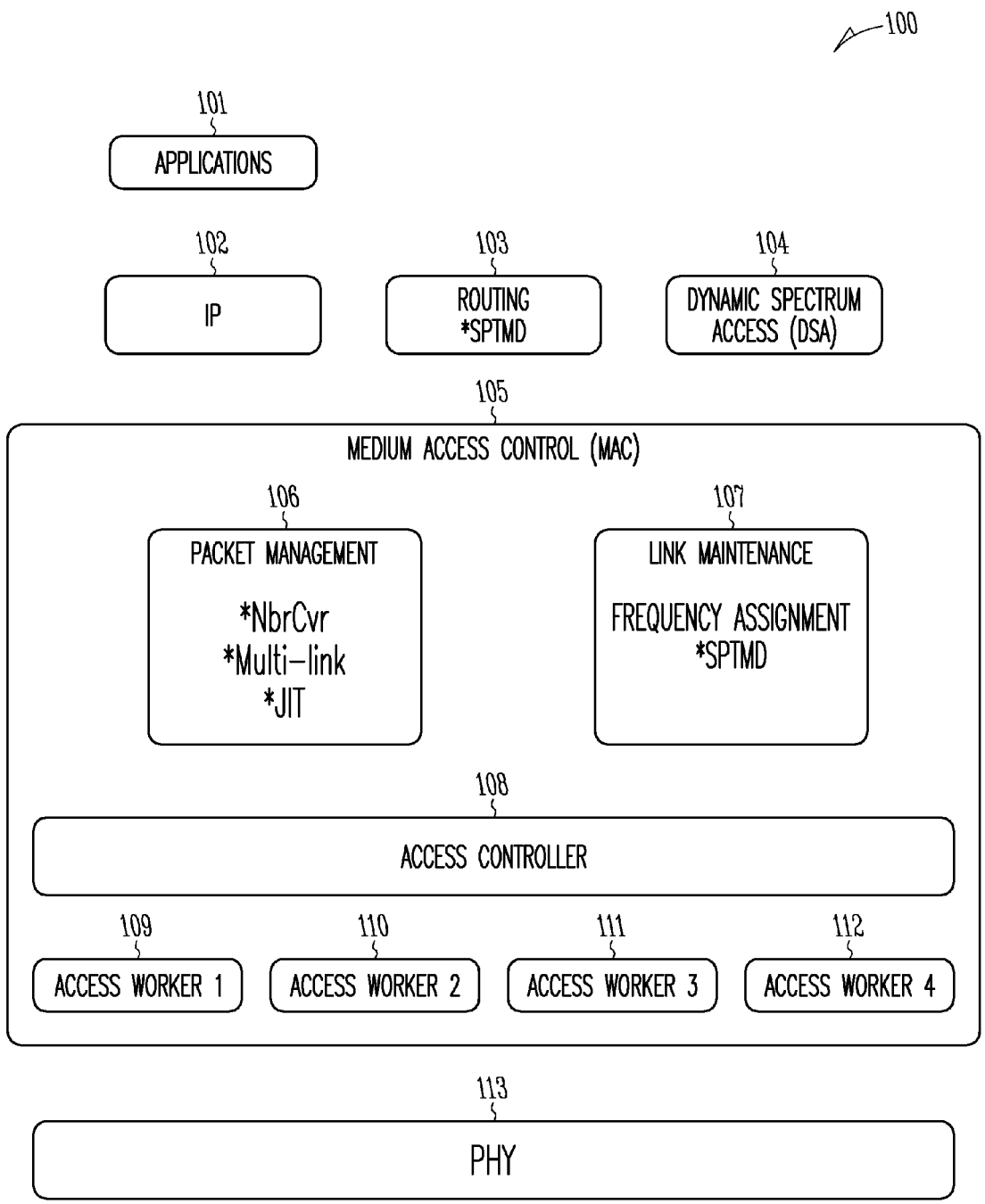
FIG. 1 is a functional diagram of exemplary layers of a networking interface in accordance with some embodiments.

FIG. 1 illustrates exemplary layers of a networking interface 100. The networking interface can follow the Open Systems Interconnection model (OSI) and have an application layer 101, network layer 102, which may use Internet Protocol (IP) for routing 103, and may also handle Dynamic Spectrum Access (DSA) 104. Networking interface 100 may further include a data link layer for Media Access Control (MAC) 105, which may perform packet management 106 and Link Maintenance (LM) 107. MAC 105 may further include access controller 108 and access workers 109, 110, 111, and 112. Finally, networking interface can include a physical layer PHY 113. Before explaining the functions of each of these elements, an explanation of an exemplary network is helpful.

Figure 2:
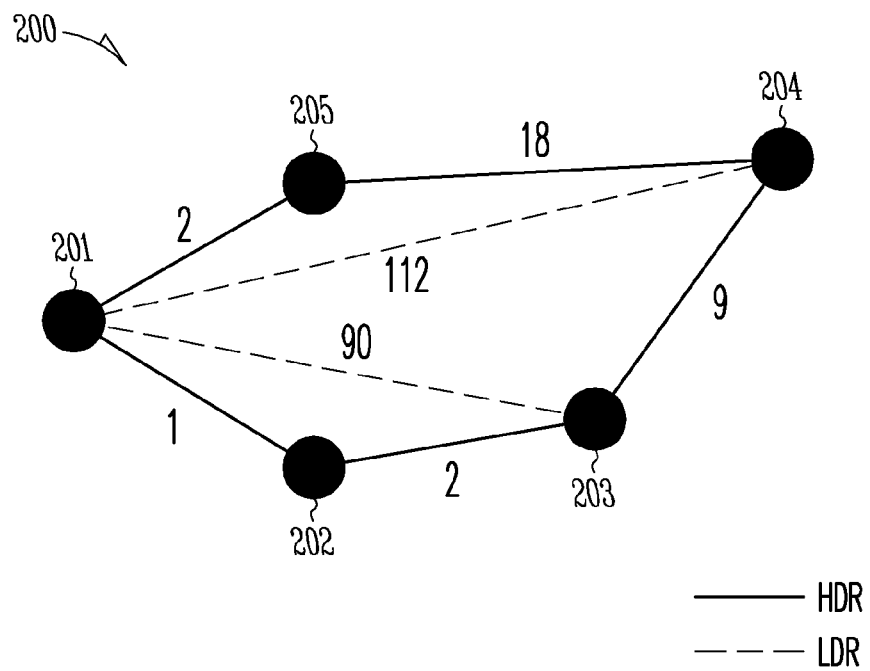
FIG. 2 illustrates an exemplary network in accordance with some embodiments.

FIG. 2 illustrates an exemplary network 200 in which node 201 has LDR neighbors (203 and 204) that are also available via a multi-hop HDR route, via nodes 202 and 203, or 205. Node 201 can originate LSUs even though it has no use for the LDR link as it can route unicast packets through the cheaper multi-hop, HDR route (201-202-203) or (205-204). This can be generalized to all short-path routing protocols.

Network 200 can further include different costs for each path. For example, in a system using DSA 104, wherein links between nodes may utilize different radio frequencies resulting in different bandwidths or costs. Table 1 lists the cost of links between each node and its neighbors:

TABLE 1

| Link | Cost |
| --- | --- |
| 201-202 | 1 |
| 202-203 | 2 |
| 203-204 | 9 |
| 204-205 | 18 |
| 205-201 | 2 |
| 201-204 | 112* |
| 201-203 | 90* |

The asterisks denote LDR links, which have much larger costs than HDR links.

Multi-rate networks are examples in which links may have different data rates or costs. Networks having different costs face an even bigger challenge with any broadcast packets, which are intended for all of a node's neighbors. Broadcast packets are sent over LDR links whenever the source node has at least one neighbor on an LDR link, regardless of existing multi-hop HDR routes. For networks that use very low data rates (e.g., <<1 Mbps), shortest-path routing is not scalable because shorter routes will push broadcast packets onto LDR links, threatening the network with collapse because each node may receive multiple copies of each broadcast packets, thereby wasting resources. To solve this problem, embodiments can suppress unnecessary broadcast packets and shift the burden of broadcasting from LDR links to lower-cost HDR links whenever possible. Note that systems with only one data-rate and transceiver do not have this problem—the link to any neighbor is also the lowest-cost route at any given point.

Very low data rates help close long distances but threaten network scalability due to broadcast packets causing network congestion on LDR links. For example, in a multi-rate system, it is common for a node to establish LDR-only links with at least one faraway neighbor. The cost of LDR links is very high because LDR transmissions occupy the channel for long periods relative to HDR links. An LSU flood throughout the network may be triggered every time the best LDR link to the distant neighbor comes up or down (e.g., "link flapping"). The LSUs may be necessary, if there is no other way to reach the LDR-only neighbor, or completely wasteful, if there is a cheaper route. In the case of a cheaper route to an LDR neighbor, routing 103 has no use for information about the LDR link because embodiments can route packets through the lower-cost, multi-hop path, thereby avoiding the LDR link.

Information required to stem unnecessary LSUs can be split between MAC 105, which knows about all the links it establishes with direct neighbors but does not have a multi-hop view, and routing 103, which can manage routes and their costs but not individual link profiles.

Embodiments can suppress LSUs originated by flapping on LDR links to neighbors with whom a node already has a lower-cost HDR-only route, as illustrated as the path from 201-205-204 of FIG. 2. In some embodiments, routing 103 or MAC 105 can suppress updates from LDR-only neighbors, if alternate routes exist, so that LDR links are not used. Some embodiments include notifying routing 103 of neighbors that are next-hop-neighbors, while MAC layer 105 can be allowed to see all one-hop-neighbors. Next-hop-neighbors are neighbors that are on a shortest path. Non-next-hop-neighbors are neighbors that are not on a shortest path.

By allowing MAC layer 105 visibility to all one-hop-neighbors, MAC layer can choose which of these neighbors to allow routing 103 to see.

Embodiments can be implemented in, for example, MAC 105, routing 103, or both. If in MAC 105, MAC 105 can ignore LSUs from non-next-hop-neighbors, and suppress LSUs from non-next-hop-neighbors. In another embodiment, routing 103 can convert LSUs to multicast packets intended for non-suppressed or next-hop-neighbor. Furthermore, routing 103 can exclude some packets that it typically does not handle, e.g., packets from other services including time synchronization packets and localization packets.

Embodiments can generate LSUs whenever a change occurs on the best link to any of its neighbors or next-hop-neighbor (hereinafter the "neighbor cost"), which is needed to compute lowest-cost routes. However, embodiments could omit these updates, if they know that a lower-cost, multi-hop path to the neighbor exists. These embodiments can check information in the routing table to determine whether a lower-cost route exists. The information can include destination nodeId, route cost and the number of hops.

When generating LSUs, these embodiments can compare the new cost of the best link to every one of its neighbors against the cost of other paths to its neighbors. LSU can be suppressed whenever the cost of one path is greater than another. In other words, if a direct link to a neighbor $N_0$ has a higher cost than a multi-hop route, either MAC layer 105 or routing 103 can suppress packets, such as LSUs, from the more expensive direct link.

Further embodiments can suppress LSUs from direct neighbors who were previously considered down, as is the case, for instance, when a multi-hop-neighbor, also reachable via a low-cost route, turns on an LDR link. Routing 103 may not be notified by MAC layer 105 of this new LDR neighbor, even though MAC layer 105 may be at liberty to use the direct link. Routing 103 need not be notified of the new direct link if a lower-cost, multi-hop route exists.

Two other cases of LSU suppression can happen when routing 103 was last told of the presence of an LDR-only neighbor ($N_0$). In the first, $N_0$ disappears and LM 107 actively notifies routing 103 that the neighbor has gone away. While one LSU may be flooded because of this notification, the neighbor will be kept out of the updates to routing 103 were it to appear again. In the second case, only the neighbor cost changes (although it remains above the route cost) and the neighbor is still present on the link. To prevent an LSU from being originated, LM 107 repeats the last neighbor cost it reported to routing 103, which has no effect on the accuracy of routes in use—there is a better route anyway.

All broadcast packets, like LSUs, are intended for every neighbor. In a network environment with scattered nodes using multiple data rates, nodes commonly have at least one LDR-only neighbor $N_0$. Broadcast packets, by attempting to reach all neighbors, will necessarily have to be transmitted at LDR to cover that one node.

Embodiments ensure that, if a lower-cost, multi-hop route exists to a neighbor, a node will not attempt to reach the neighbor directly. In addition to the suppression technique above, LM 107 can remove LDR-only neighbors that are otherwise routable from the routing table. For every change in a node's link profiles and neighbors, LM 107 iterates through its neighbors and stores the list of links on which it is seeing each one of them. If LSU suppression is engaged, the neighbor is simply removed from the routing table and packets will be transmitted to a second neighbor on a cheaper path to the neighbor. On the other hand, if LSU suppression to a neighbor stops, LM 107 will add the neighbor, as well as the list of links on which it is seen.

Figure 3:
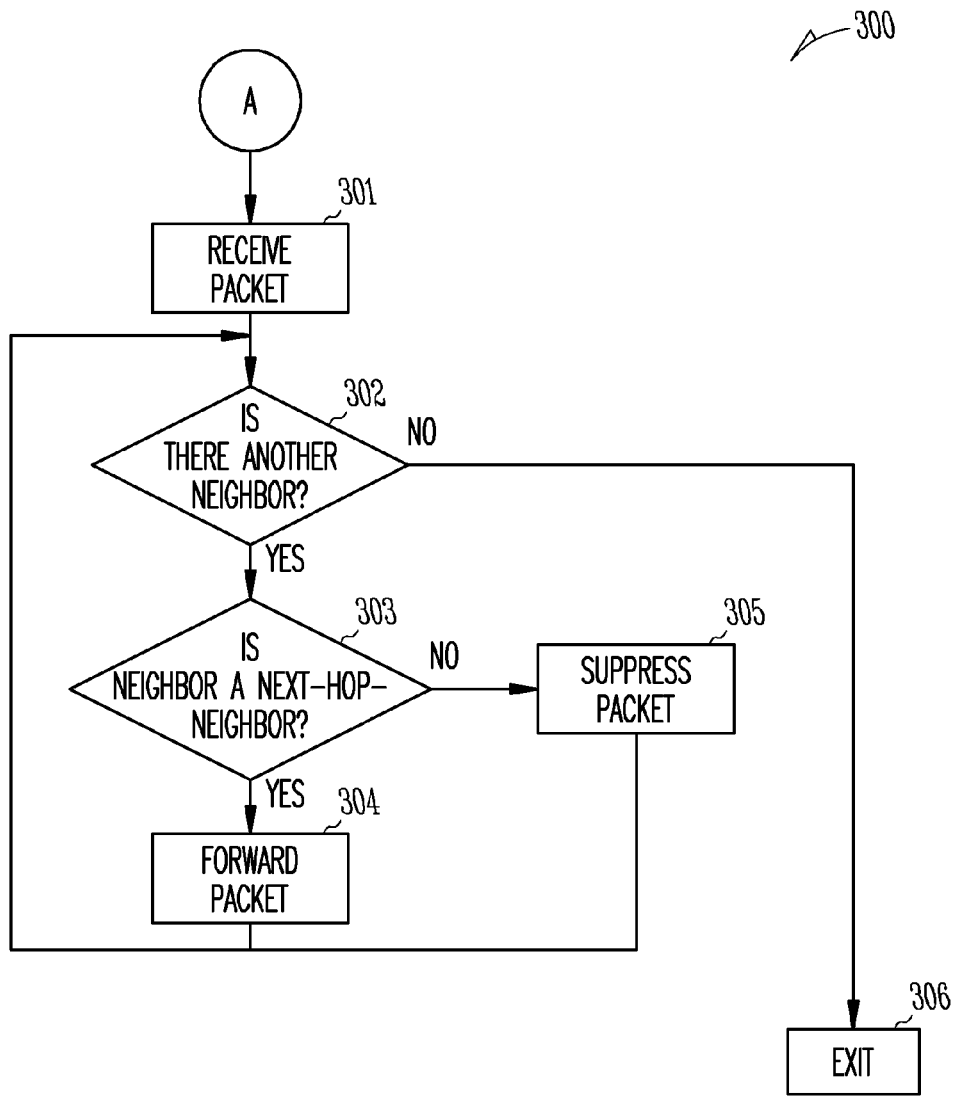
FIG. 3 illustrates a flow chart of handing a packet in accordance with some embodiments.

FIG. 3 illustrates an exemplary flow chart or algorithm for handling a packet. In step 301, a node receives a packet, e.g., an LSU or any other broadcast, multicast or unicast message. Next, the node decides whether it has any neighbors (step 302). If not, the algorithm exits in step 306. If there are neighbors, the node examines each of its neighbors in the routing table to determine whether each is a next-hop-neighbor (step 303). Alternative embodiments may omit step 303 because only next-hop-neighbors may be in the routing table, and the node transmits packets to all neighbors in the routing table (which non-next-hop-neighbors are excluded from). For neighbors that are next-hop-neighbors, step 304 illustrates forwarding the packet. If the neighbor is a non-next-hop-neighbor, the node suppresses the packet from forwarding to the non-next-hop-neighbor (step 305). Finally, after the node examines each of its neighbors, step 306 illustrates exiting the algorithm. Each node receiving the packet may perform the same or similar operation according to the various embodiments described herein.

In any case, embodiments suppress packets from non-next-hop-neighbors. This may be applied to all proactive short-part routing protocols, including Destination-Sequenced Distance Vector routing (DSDV), Link State Routing, etc., for any network.

Imagine now that FIG. 2 is a network and performs DSDV. A link change on any LDR link is of no importance to nodes in the network, provided the cost of those links remains above the lower-cost, multi-hop routes. Taken a step further, all control packets may be suppressed from non-next-hops neighbors, as defined by the routing tree. In the case of FIG. 2, this would transmit packets only to next-hop-neighbors connected via an HDR link by suppressing packets from non-next-hop-neighbors.

Consider a source node s that builds a directed graph G=(N, E) with non-negative weights on the edges, as it would if it ran the Dijkstra algorithm. $d_{s,i}$ denotes the weight or distance on edge $(s, i) \in E$ in the graph. Short-path algorithms find and maintain a set S of nodes $n_x \in N$ that are connected by the shortest distance. Embodiments allow route updates to only be sent to all next-hop-neighbors ($n_x \in N$). In other words, route updates should only be propagated along the shortest-paths and need not transmit to non-next-hop-neighbors, i.e., packets are suppressed from non-next-hop-neighbors.

Figure 4:
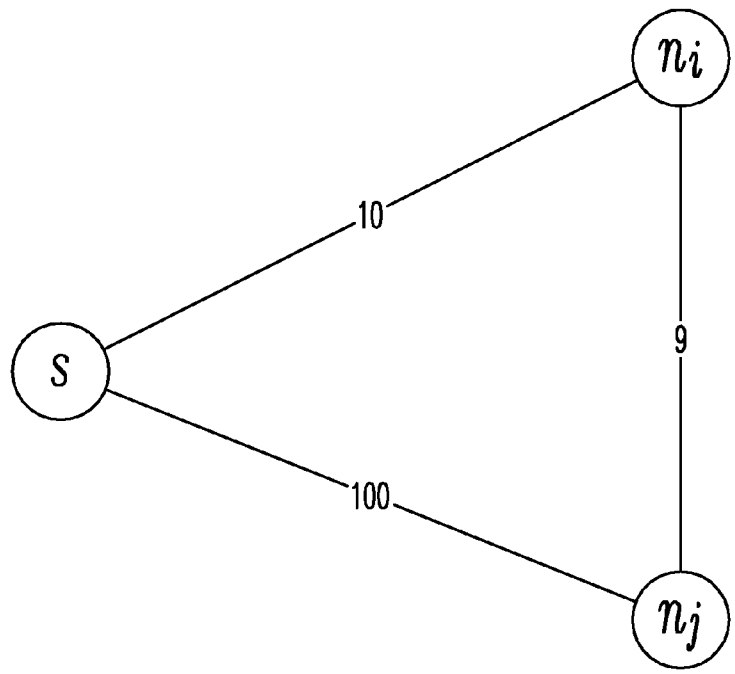
FIG. 4 illustrates another exemplary network in accordance with some embodiments.

FIG. 4 illustrates set S, having three nodes: s and $n_i$ and $n_j$. N is the set of next-hop-neighbors of node s. The neighbors of node s have two properties: (1) $d_{s,i} \leq d_{s,j}$, $\forall n_i \in N$, $\forall n_j \notin N$ and (2) for all nodes $n_x \in S$, there exists a shortest path from s to $n_x$. In the example of FIG. 4, there is a direct link $d_{s,j}$ connecting nodes s and $n_j$, and a node $n_i$ along the shortest path from s to Assume, for the purpose of contradiction, that direct transmissions from s to $n_j$ are needed to reach $n_j$. This means there is no shorter path between s and $n_j$ other than $d_{s,j}$, which we know to be false from property (b): if we had $d_{s,j} < d_{s,i} + d_{i,j}$, it would mean that $n_i$ is not in S, contradicting (b).

A corollary is that a link change that does not modify N does not have to be reported.

Assume the same conditions as previously. Some embodiments do not update the network if the changes that occur on $d_{s,j}$ maintain N, that is if: $d_{s,j} > d_{s,i} + d_{i,j}$.

For contradiction, let us assume that omitting the update, given the previous inequality, modifies N. One of two things may happen: $n_i$ may no longer be a next-hop-neighbor of s and/or $n_j$ may become a next-hop-neighbor. For $n_i$ to no longer be a next-hop-neighbor, the following must be true $d_{s,j} + d_{i,j} < d_{s,i}$. It can only be true if $d_{i,j} < 0$, which is not allowed.

Embodiments may extend to all networks running a short-path routing protocol. If routing uses a cost to discriminate between link properties, whether they be data rate, frequency, or any other metric, these embodiments send packets to the set of next-hop-neighbors defined by the short-path tree and suppresses changes that conserve the tree.

In Distance-Vector implementations, every node maintains a table of the smallest distance to all destinations in the network and shares their view with all one-hop-neighbors. If its neighbor signals having a better route to a distant destination, a node adopts the route as its own and marks the neighbor as the next-hop-neighbor to reach that destination. A packet is routed by letting all nodes along the path forward to the best next-hop-neighbor they know, which results in routing along the shortest-path. Distance-Vector routing does not scale to large networks since all nodes must share a routing table that grows with the total number of nodes in the network.

Min-Hop routing is a special case of short-path where all of a node's neighbors are next-hop-neighbors. Embodiments may run on such networks, but its suppression schemes never trigger, leaving routing incapable to scale to larger networks using LDR.

Figure 5:
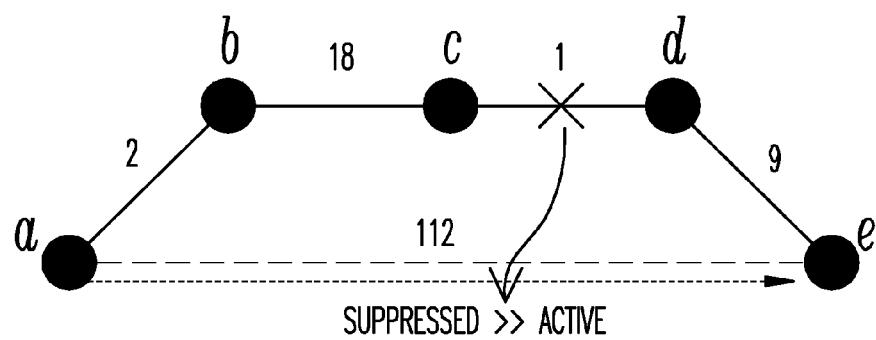
FIG. 5 illustrates yet another exemplary network in accordance with some embodiments.

Some embodiments raise questions of resilience to route breakage since they may suppresses direct back-up LDR routes, which may or may not be accurate. In these embodiments, the routes will converge, but the speed of convergence may be marginally affected in certain cases. Consider FIG. 5, where node a sends packets to node e through a multi-hop route, which then breaks. Without packet suppression, node a will continue to forward packets via the broken route until it receives an LSU indicating link c-d is broken. Only then can routing 103 use the back-up direct link a-e, which is immediately available. With packet suppression, the same is true, although link a-e needs to be brought up. Route recovery is delayed if and only if MAC 105 fails to report the direct LDR link before notification that the route broke reaches node a. Simulations show that this timing matter is a rare occurrence and test results suggest that the benefits of packet suppression outweigh these limitations.

Figure 6:
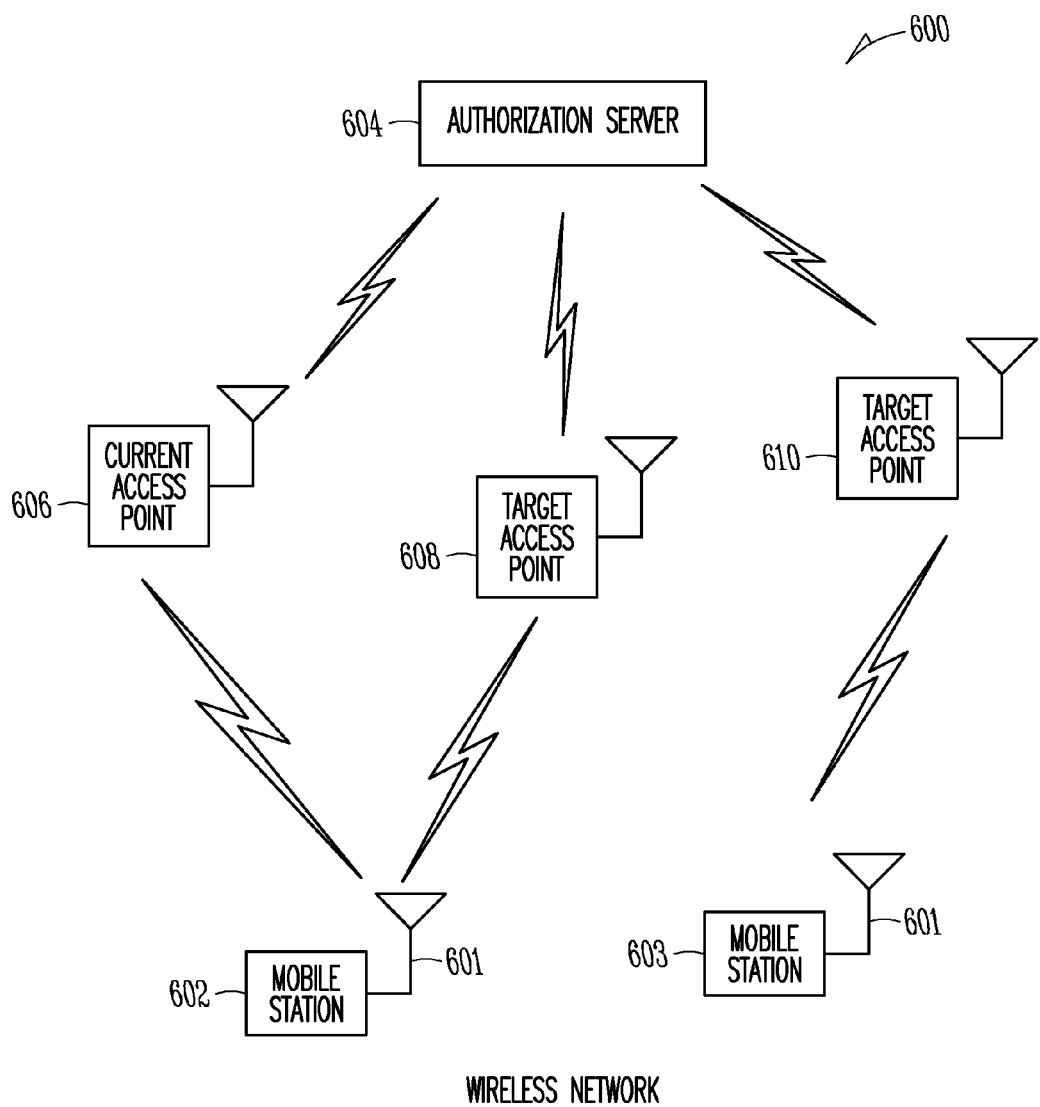
FIG. 6 illustrates exemplary components of a network in accordance with some embodiments.

FIG. 6 illustrates a network system 600 including an authorization server or central server 604, access points 606, 608, and 610, and mobile stations or notes 602 and 603. Infinite configurations of access points, mobile stations, and authorization servers is possible, and network system 600 is simply illustrative. Interestingly, mobile stations 602 and 603 are coupled to each each other by multiple links. If these links have different costs, then embodiments of this disclosure could be used for efficient packet routing and suppression as described above.

Mobile stations 602 and 603 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antennas 601 may comprise one or more directional or omni-directional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 601 may be effectively separated to take advantage of spatial diversity and the different channel characteristics that may result each of antennas 601 and the antennas of a transmitting station. In some MIMO embodiments, antennas 601 may be separated by up to 1/10 of a wavelength or more.

In some embodiments, the mobile stations 602 and 603 may include one or more of a keyboard, a display, a non-volatile memory port, multiple antennas, a graphics processor, an application processor, speakers, and other mobile device elements. The display may be an LCD screen including a touch screen.

Although system 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of system 600 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be arranged with instructions stored on a computer-readable storage device.

The Abstract is provided to comply with 37 C.F.R. §1.72(b) requiring an abstract that will allow the reader to ascertain the nature of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of routing or forwarding packets on two or more paths, which couple nodes on a computer network, the method comprising:
   determining, via one or more network nodes, a cost of the two or more paths;
   analyzing, via the one or more network nodes, the cost to determine a shortest path between nodes;
   generating, via the one or more network nodes, a shortest-path routing table;
   transmitting, via the one or more network nodes, a broadcast-related packet from a first link of the two or more paths; and
   suppressing, via the one or more network nodes, the broadcast-related packet from forwarding to a second link, different from the first link, of the two or more paths.

2. The method of claim 1 further comprising:
   receiving a broadcast or multicast packet; and
   suppressing the broadcast or multicast packet from forwarding to the second link of the two or more paths.

3. The method of claim 1 further comprising determining whether a lower-cost path exits to a destination.

4. The method of claim 3, wherein the one or more nodes connected by the second link are non-next-hop neighbors.

5. The method of claim 1, wherein suppressing occurs at a network layer or below according to the OSI model.

6. The method of claim 1 further comprising, receiving, by at least one of the one or more network nodes, an indication that a cost of at least one of the paths has changed.

7. The method of claim 6, wherein the broadcast-related packet comprises the indication that the cost of at least one of the paths has changed.

8. The method of claim 1, wherein suppressing, via the at least one of the one or more network nodes, comprises suppressing the broadcast-related packet from forwarding to a non-next-hop-neighbor.

9. A device comprising:
   a processor;
   a memory coupled to the processor and arranged to store a routing table;
   a port arranged to receive packets; and
   a MAC, coupled to the port, arranged to receive packets from the port and to communicate with the processor to perform a lookup in the routing table to determine whether neighbors are next-hop-neighbors or non-next-hop-neighbors;
   the MAC further arranged to forward the packets to next-hop-neighbors and suppress the packets from forwarding to non-next-hop-neighbors.

10. The device according to claim 9 further comprising a routing layer arranged to perform the lookup in the routing table to determine whether neighbors are next-hop-neighbors or non-next-hop-neighbors.

11. The device according to claim 9, wherein suppressing the packets constitutes not forwarding the packets to non-next-hop-neighbors.

12. The device according to claim 9, further comprising a network layer.

13. The device according to claim 12, wherein the MAC is further arranged not to forward link state updates to the network layer.

14. The device according to claim 13, wherein the MAC is further arranged to forward link state updates to the network layer only if the link state update is from a next-hop-neighbor.

15. The device according to claim 14, wherein the MAC maintains a table of neighbors.

16. The device according to claim 15, wherein the MAC is further arranged to notify the network layer of non-next-hop-neighbors when a non-next-hop-neighbor becomes a next-hop-neighbor.

17. The device according to claim 9, wherein the device is further configured to disable and enable suppressing the packets from forwarding to non-next-hop-neighbors.

18. A system comprising:
   a plurality of nodes; and
   a plurality of links having varying costs and coupling the plurality of nodes;
   the plurality of nodes arranged to determine the costs of links to which each node is coupled;
   the plurality of nodes further arranged to determine whether a neighbor is a next-hop-neighbor or a non-next-hop-neighbor;
   the plurality of nodes further arranged to receive packets and to forward the packets only to next-hop-neighbors.

19. The system according to claim 18, the plurality of nodes further arranged to identify when a non-next-hop-neighbor changes to a next-hop-neighbor.

20. The system according to claim 18, wherein the links are wireless and use varying wireless frequencies.

21. The system according to claim 18, wherein the nodes are arranged to use a plurality of wireless frequencies and transceivers.

\* \* \* \* \*